March 4, 1941.　　W. GILBERT, SR　　2,233,599
SEALING MEANS
Filed June 11, 1938　　4 Sheets-Sheet 1
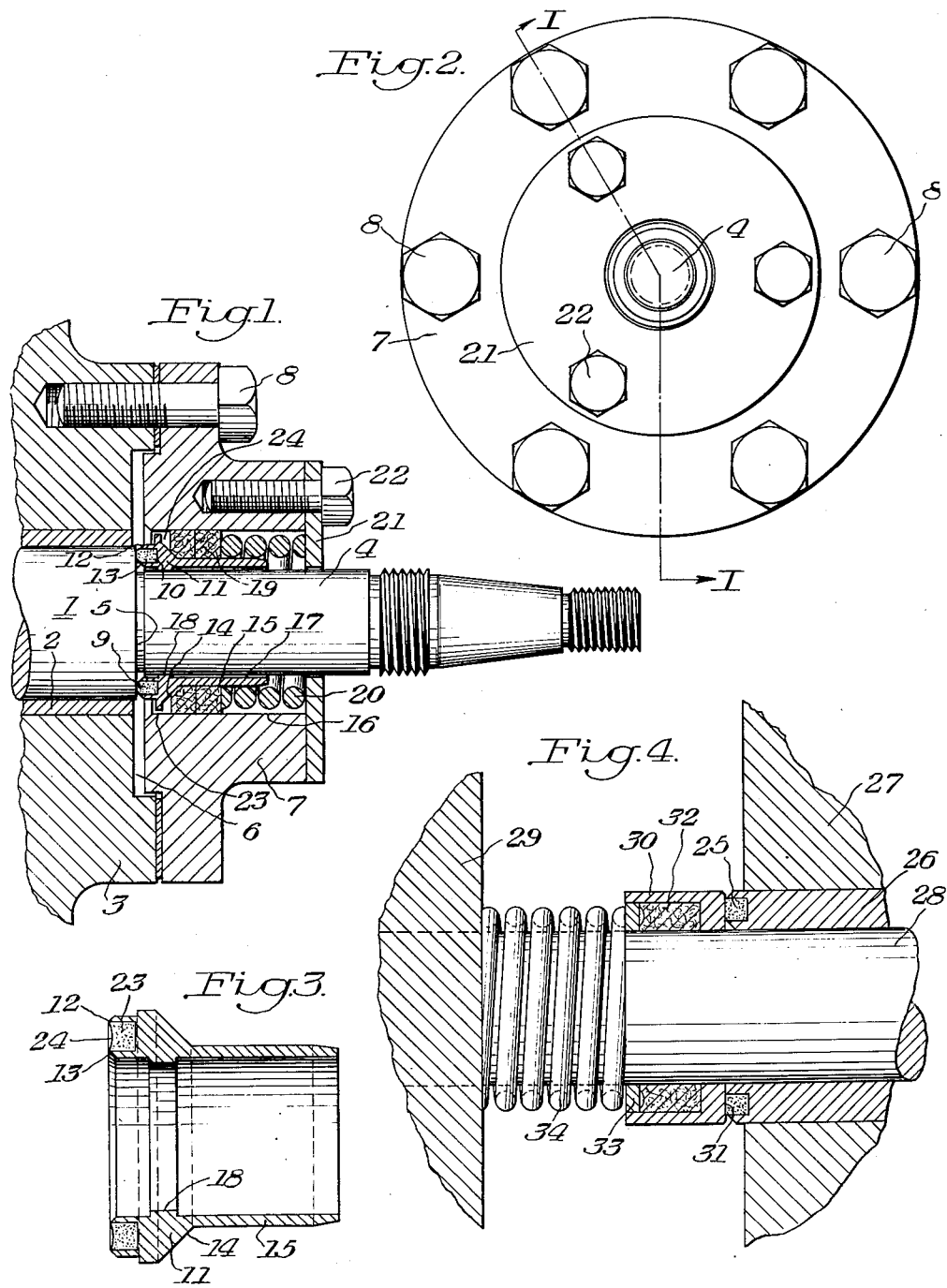
INVENTOR.
Walter Gilbert, Sr.
BY Lewis D. Knigeford
ATTORNEY.

March 4, 1941. W. GILBERT, SR 2,233,599
SEALING MEANS
Filed June 11, 1938 4 Sheets-Sheet 2
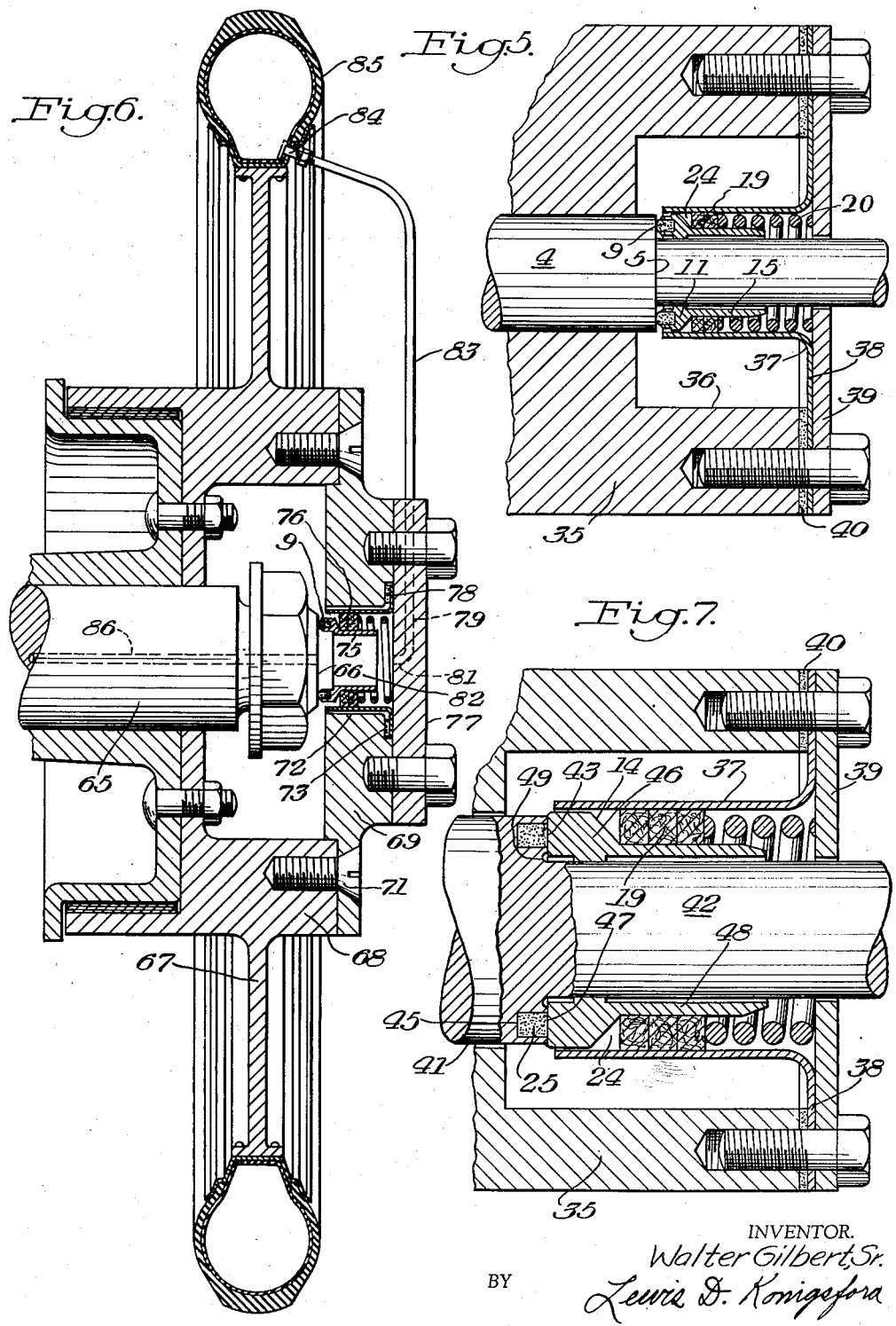
INVENTOR.
Walter Gilbert, Sr.
BY Lewis D. Konigsford
ATTORNEY.

March 4, 1941.   W. GILBERT, SR   2,233,599
SEALING MEANS
Filed June 11, 1938   4 Sheets-Sheet 3
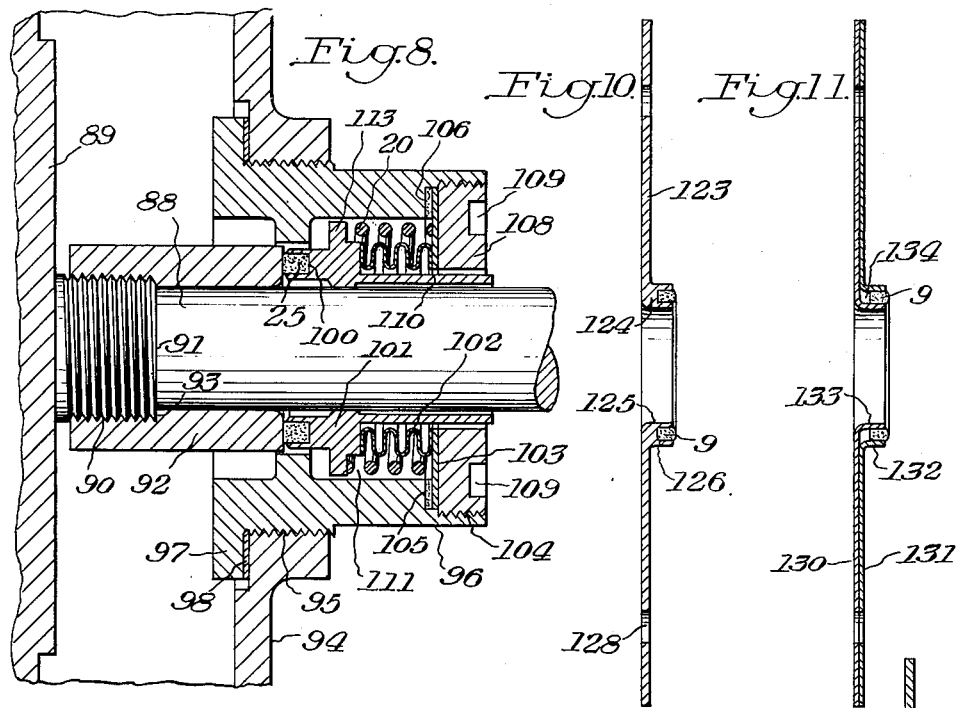
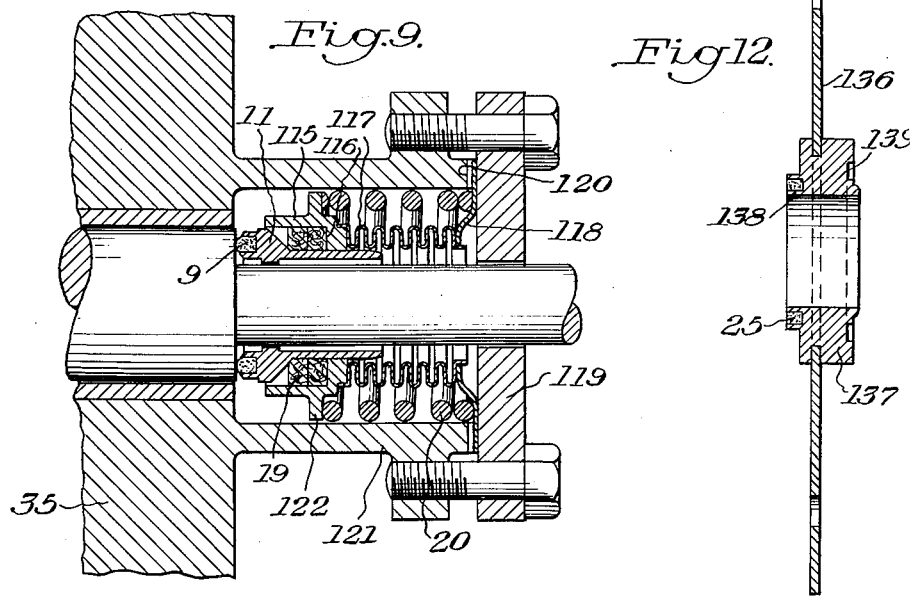
INVENTOR.
Walter Gilbert, Sr.
BY Lewis D. Kingsford
ATTORNEY.

March 4, 1941. W. GILBERT, SR 2,233,599
SEALING MEANS
Filed June 11, 1938 4 Sheets-Sheet 4
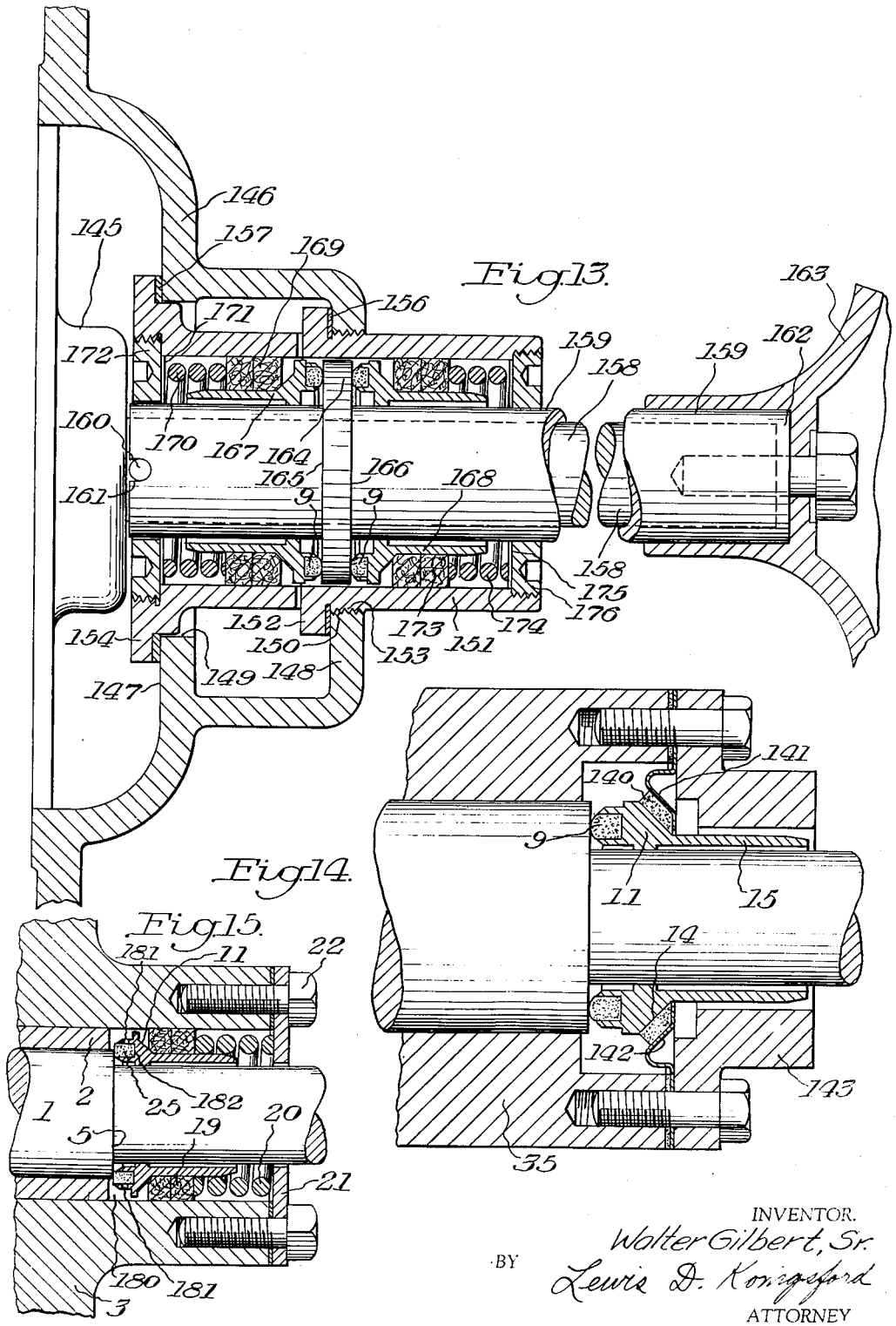
INVENTOR.
Walter Gilbert, Sr.
BY Lewis D. Kingsford
ATTORNEY

UNITED STATES PATENT OFFICE 2,233,599

SEALING MEANS

Walter Gilbert, Sr., Johnstown, Pa., assignor to Syntron Company, Homer City, Pa., a corporation of Pennsylvania Application June 11, 1938, Serial No. 213,199

1 Claim. (Cl. 286—7)

This invention relates to sealing means for sealing members rotating or oscillating with respect to each other, such as the shafts and casings and the like in pumps, refrigeration compressors, turbines, engines, drilling machines, ship propulsion, pneumatic tired vehicle wheels and like apparatus.

It is an object of the invention to provide a shaft sealing mechanism adapted to operate efficiently without adjustment for long periods of time.

A further object of the invention is to provide a sealing mechanism in which the sealing pressure is not substantially affected by changes in pressure of the confined fluid; in which scoring of the surfaces at the seal is obviated, and which may, if desired, be operated without external lubrication.

Another object is to provide a self-lubricating sealing device that is rapidly "broken in" into sealing relationship, and in which the sealing member is not liable to be cracked or chipped out in service.

A further object of the invention is to provide a simple sealing assembly that may be used to replace packings heretofore in use, for example, in refrigerant compressors, without modification or alteration of the parts of the compressor.

Another object of the invention is to provide a sealing mechanism for a vehicle wheel through which the pressure condition of the tire may be transmitted to a stationary indicator in the vehicle.

In accordance with the invention, a sealing ring composed of an unctuous solid, such as graphite or graphitic material, engages an abutment, the sealing ring and abutment being rotatable relative to each other. Preferably, the abutment is on the rotating part and the sealing ring is relatively fixed. The abutment engaging surface of the sealing ring preferably is raised above the holder, and slightly rounded, and as the raised portion wears very rapidly filling in any pits or score marks in the abutment the sealing ring rapidly "breaks in" into sealing relationship with the abutment, and as the sealing ring wears the area of contact gradually changes. However, the abutment engaging surface of the ring may be flat or concave, if desired. The sealing ring preferably is contained in a recess in a holder having very thin walls, or the walls of the recess may be tapered to relatively sharp edges so as to obviate scoring of the abutment when the sealing ring wears down to the edges of the holder. The unctuous or graphitic sealing material used may be a premoulded ring set in the groove in the holder and cemented therein by any suitable binder which is fixed by drying or baking. After assembly the seal preferably is placed in heated oil or melted wax or the like so that a certain amount is absorbed by the porous structure of the sealing ring. The absorbed oil or wax serves to close the pores of the sealing ring, thus making it pressure tight, and serves also as a lubricant for the surface against which the sealing ring abuts.

The holder may be sealed with respect to its housing in any suitable manner. In a preferred embodiment the rear face of the holder is tapered toward the center and has a rearwardly extending sleeve which receives a plurality of packing rings between the sleeve and casing to hold the ring against turning and prevent leakage between the sleeve and the casing of the compressor or the like, the sealing ring being held in sealing relation to the abutment by the same spring which compresses the packing rings. The packing has a tendency to ride on the inclined rear face of the holder and resists strongly any tendency of the holder to move away from the abutment, while at the same time the packing allows relatively easy movement of the holder toward the abutment under the compressive force of the spring. An equalization chamber is formed between the rear face and packing rings and as the fluid can enter the equalization chamber and counterbalance the pressure on the exposed face of the holder, the force holding the sealing ring against the abutment is nearly entirely independent of variations in the pressure of the confined fluid. In place of packing a metal bellows or other type of diaphragm may provide a seal between the sealing ring holder and casing.

The invention will be described in greater detail in connection with the accompanying drawings, wherein I have shown preferred modifications of my invention, and wherein:

Figure 1 is a sectional view of a preferred embodiment of my invention taken on line I—I of Figure 2, Figure 2 is an end view of Figure 1, Figure 3 is an enlarged view of a modified sealing ring and holder, Figure 4 is a sectional view of a further modification, Figure 5 is a sectional view of still another modification, Figure 6 shows my invention applied to the tired wheel of a vehicle, Figure 7 is a sectional view of a further modification, Figure 8 shows a modification showing a metallic bellows for sealing the holder relative to the casing, Figure 9 shows a modification employing packing rings and a metallic bellows, Figures 10, 11 and 12 show modifications employing diaphragms for sealing the holder relative to the casing, Figure 13 is a modification showing a double seal, Figure 14 shows a further modification of a sealing ring holder and packing assembly, and Figure 15 shows a further modification adapted to be self-lubricating.

Referring to the drawings, in Figure 1 the drive shaft 1 extends through a bearing 2 in the stationary compressor casing 3 and a reduced portion 4 of the shaft forms a shoulder 5. A recess 6 surrounds the shaft 1 and receives an adapter plate 7 secured to the casing by cap screws 8 extending through a flange on the adapter. The face of shoulder 5 provides an abutment which preferably is polished smooth to provide a sealing surface, and a sealing ring 9 of graphite or other unctuous solid material is located in abutting relation to the sealing surface of the shoulder 5.

The sealing ring 9 is contained in a recess 10 in the holder 11, the walls of the recess preferably being thin and being tapered at their ends to relatively sharp edges as indicated at 12 and 13 to obviate scoring of the abutment surface when the sealing ring becomes worn level with the holder. The abutment engaging face of the lubricant ring 9 preferably is rounded so as to extend approximately one sixty-fourth of an inch (more or less) beyond the edges 12 and 13 at its center. The rounded face has the advantage that it initially presents only a thin annulus to the shaft shoulder which wears down relatively rapidly filling any pits or score marks on the shoulder which otherwise would allow leakage between the sealing ring and shoulder.

The seal thus is rapidly broken into sealing relationship, this feature being especially important where the shoulder is not sufficiently polished. Also, by having the abutment engaging face rounded there is no tendency for the graphite of the sealing ring to chip out, such as would occur if the edges of the ring were formed with sharp corners. For example, in some installations it was found that a graphite ring with a flat seating surface and sharp edges required operation of the shaft for about forty-five minutes before sealing was effected, whereas in the case of a rounded graphite ring, sealing was accomplished in from ten to five minutes under comparable conditions. This is an important advantage where corrosive fluids or noxious gases are handled.

The rear face 14 of the holder is tapered rearwardly, and terminates in a sleeve 15 extending along the shaft in a bore 16 in the adapter 7. A slight clearance as indicated at 17 is provided between the sleeve 15 and the shaft 4 to allow for eccentricity or misalignment, and an annular projection 18 provides a bearing for centering the holder with relation to the shaft. A packing 19 is interposed between the sleeve 15 and the wall of recess 16 and is placed under compression by a spring 20 abutting against a closure plate 21 held on adapter 7 by cap screws 22. The packing preferably comprises a plurality of separate preformed rings which may be whole or split and are composed of "Duprene" or other synthetic rubber, fabric, rubber, lead, or the like. The spring pressure causes them to ride on the base of inclined face 14 which expands the rings and compresses their outer peripheries radially against the wall of recess 16. The rings are thus deformed in a manner to resist strongly any tendency of the holder to move away from the abutment, while at the same time they allow relatively easy movement of the holder toward the abutment, under the compressive force of the spring. As a result the holder may move toward the abutment to take up wear on the sealing ring, and resists pressure tending to separate the sealing ring and abutment.

A slight clearance indicated at 23 is provided between the outer periphery of the holder 11 and the inner surface of the recess 16, so that line fluid has access to balancing chamber 24 formed between surface 14 and the packing rings. The pressure holding the sealing ring and abutment together therefore depends on the relation of the exposed areas on opposite sides of the holder, and if the exposed areas are equal, is substantially independent of variations in the pressure of the confined fluid in the casing of the compressor whether such pressures be above or below atmospheric pressure. Preferably the exposed areas of holder 11 are made as nearly equal as possible so that substantially the only force exerted against ring 9 is that of spring 20 and the spring need only be strong enough to hold the sealing ring 9 seated against the differential pressure on the two sides of the sealing ring. Rapid wear and heat resulting from excessive sealing pressures thus are avoided.

In the modification shown in Figure 3, the sealing ring 23 has a concave face 24 adapted to abut the shoulder 5, and which may be flush with the edges 12 and 13 or extend slightly beyond the edges.

In the modification shown in Figure 4, a sealing ring 25 is embedded in a stationary sleeve 26 suitably held in sealing relation in the casing 27 surrounding the rotating shaft 28 which has a rotor 29 secured thereon within the casing. Collar 30 presents an abutment surface 31 to the sealing ring 25 and has a packing recess 32 containing packing therein which is compressed by a follower ring 33 held against the packing by a spring 34 which abuts the rotating impeller 29 on the shaft. Leakage between the collar 30 and shaft 28 thus is prevented. The sealing ring 25 preferably extends slightly beyond the face of holder 26 and has a flat face, and the walls of the recess 43 are relatively thin and tapered at their ends. If desired the abutment engaging face may be concave or convex. In this modification the pressure inside the casing assists the spring in holding the collar 30 and sealing ring 25 in abutting relation.

In the modification shown in Figure 5 the stationary compressor casing 35 has an integral extension surrounding the rotating shaft 4 which provides a recess 36 adapted to house the sealing mechanism. An adapter sleeve 37 has a flange 38 whereby it is secured in place between the extension of the casing and a cover plate 39 bolted to the extension. A gasket 40 is interposed between the flange 38 and the end of the casing extension to seal the casing of the compressor at this point. The packing rings 19 interposed between the sleeve 15 and the adapter sleeve 37 are placed under compression by the spring 20 abutting against the retainer plate 39 and the packing.

In the modification shown in Figure 7, the shaft 41 has a reduced portion 42 providing a shoulder 43 in which is embedded a sealing ring 25 in a recess 45. Preferably the sealing ring 25 has a flat face and extends slightly beyond the shoulder 43. An abutment member 46 surrounds the reduced portion 42 of the shaft and has an abutment face 47 engaging the sealing ring 44, and a sleeve 48 extends rearwardly therefrom. The packing rings 19 between the sleeve 48 and adapter 37 prevent escape of fluid beyond balancing chamber 24, and the spring 20 urges the packing against shoulder 14 and urges abutment member 46 into sealing engagement with sealing ring 25. A kerf 49 relieves the junction of shoulder 43 and shaft 42, so that as the shoulder wears there will be no interference with the abutment member.

In Figure 6 I have shown a further modification of the invention in which the abutment of the shaft is stationary and the sealing ring is rotatable. This modification is of particular application to vehicle wheels having pneumatic tires mounted thereon so that the state of air pressure in the tire may be observed while the wheel is rotating. The axle 65 has an abutment surface 66 which is machined smooth and is polished. The wheel 67 is rotatably mounted on the axle in any suitable manner and has an enlarged hub 68 to which is secured a closure plate 69 by screws 71 or other suitable means, this plate having a bore 72 at its center surrounded by a shoulder 73. A sealing ring 9 is mounted in a holder 75 similar to holder 26 shown in Figure 1, located in the bore 72, and a surrounding flanged sleeve 76 encloses the sleeve of holder 75 and is clamped to the plate 69 by a clamping plate 77 which completely closes the end, gasket 78 being interposed between the sleeve and the shoulder to provide a fluid tight seal. The plate 77 has a radial passage 79 therethrough terminating in a central passage 81 and communicating with the chamber 82 in the holder 75. A tube 83 secured to the radial passage 79 at one end in any suitable manner communicates at its other end with the ordinary valve stem 84 of the vehicle tire 85, the valve mechanism in the stem being removed or an extra stem being provided. A bore 86 through the axle 65 connects with chamber 82 at one end and at its inner end is connected in any suitable manner to a pressure gauge or a pressure tank or pump (not shown).

From the foregoing it will be seen that air pressure is conducted through tube 83 and bore 86 from the tire to the gauge whereby the operator of the vehicle can visually determine the pressure in the tires at all times. The sealing ring 9 abutting face 66 prevents leakage of air from the system, and because of the slight wear of the sealing ring, will be effective over a long period of time. The tire may also be inflated through the passage 86, seal, passage 79 and tube 83.

In the modification shown in Figure 8 the shaft 88 having a rotor 89 thereon has an enlarged threaded portion 90 which forms a shoulder 91 therewith. An abutment sleeve 92 is threaded onto shaft 90 and has a shoulder 93 which engages shoulder 91 on the shaft in sealing engagement. The housing 94 has a threaded opening 95 and a stuffing box sleeve 96 is threaded into the opening 95 from the interior and sealed with relation thereto by a flange 97 and gasket 98. The sleeve 96 contains a sealing assembly comprising a sealing ring 25 in a recess 100 in the holder 101. A metallic bellows 102 has one end secured to a central thickened portion of holder 101, the other end being secured to a flange 103. Sleeve 96 has an internally threaded recess 104 terminating in a shoulder 105, and flange 103 is held against a gasket 106 on said shoulder by a gland 108 threaded into recess 104. Holes 109 are provided in gland 108 to receive a spanner wrench. The flange 103 thus is held in fluid tight relation and bellows 102 is soldered or otherwise secured in fluid tight relation to flange 103 and holder 101. This construction has the advantage that chattering and crystallization of the metal bellows is prevented.

Preferably holder 101 has a sleeve 110 extending along the shaft to prevent contact between the shaft and bellows. Ordinarily, the bellows and the pressure of fluid in chamber 111 are sufficient to hold the ring 99 and holder in sealing relation to the abutment 92. However, if desired, a spring 20 may be provided abutting against a flange 113 on the holder and the flange 103 secured to the bellows.

In the modification shown in Figure 9, the holder 11 is surrounded by a follower 115 having a packing recess 116 therein to receive the packing 19. A metallic bellows 117 is secured to the follower 116 at one end and at its other end is secured to the flange 118 which is clamped by cover 119 against gasket 120 on the faces of casing 121. A flange 122 surrounds follower 116, and if desired, a spring 20 may be interposed between flange 122 and flange 118.

In Figure 10 I have shown a modified holder comprising a spring plate or diaphragm 123 having an integral annular flange 124 surrounding the central hole 125. A sealing ring 9 is located in the annular recess 126 in the flange 124, and if desired the walls of the recess need not be tapered. The plate 123 may be bolted directly to the casing by bolts passing through the bolt holes 128 with a suitable gasket interposed to prevent leakage, the resiliency of the diaphragm, supplemented, if desired, by a spring, being relied on to hold the sealing ring 126 in engagement with the abutment surface.

In the modification shown in Figure 11, the resilient plate is made up of two plates 130 and 131, soldered or otherwise secured together and having flanges 132 and 133 at the center which have a recess 134 therebetween to receive the sealing ring 9.

In the modification shown in Figure 12, the resilient plate 136 is secured to a central hub 137 having a recess 138 therein to receive the sealing ring 25. The opposite side of hub 137 is grooved at 139 to receive a spring for urging the sealing ring against the abutment.

In the modification shown in Figure 13 a double vapor proof seal is provided to seal the electric motor 145 in the motor case 146. The case has double walls 147 and 148 with apertures 149 and 150 therein, and a sleeve 151 passes through the apertures. The sleeve 151 has a flange 152 intermediate its ends and is threaded adjacent thereto, at 153, whereby the sleeve is held in the motor case. Flanges 152 and 154 form sealing engagement by means of gaskets 156 and 157 with the case. The shaft 158 of the motor extends through sleeve 151 and a sleeve 159 surrounds the shaft and is secured thereto by a pin 160 passing through slots 161 in the end to rotate therewith. A gasket 162 between the sleeve and impeller 163 prevents the leakage of fluid from the pump between the sleeve 160 and shaft 159 into the motor case.

A central abutment 164 on sleeve 159 has two polished faces 165 and 166, and two holders 167 and 168 like holder 11 on opposite sides thereof in sleeve 151. The sealing rings 9 therein engage the abutment faces 165 and 166 in sealing relation. Packing rings 169 between the holder 167 and sleeve 151 are urged against the holder by a spring 170 abutting the washer 171, the inner end of sleeve 151 being closed by threaded nut 172. Packing rings 173 between the holder 168 and sleeve 151 are urged against the holder by spring 174 abutting washer 175, and the outer end of the sleeve is closed by nut 176. Any leakage from the exterior that may pass by the packing rings 173 will be unable to pass rings 169 because of the manner in which they are expanded outwardly into sealing engagement with the sleeve 151 and holder 167.

In the modification shown in Figure 14 a conical packing ring 140 rests on the inclined shoulder 14 of the holder 11, and a resilient diaphragm 141 has a conical portion 142 abutting the packing ring. The edge of the diaphragm is clamped by a cover 143 in sealing relation against the casing to prevent leakage. This construction is of particular value in maintaining a vacuum within the casing because atmospheric pressure against diaphragm 141 holds the packing in sealing relation and holds the sealing ring 9 against the abutment.

In the modification shown in Figure 15, the holder 11 containing sealing ring 25 is of such size that the outer periphery of the sealing ring extends beyond shoulder 5 of shaft 1. This construction may be used where lubricant is introduced into chamber 180 and it enables lubricant to penetrate through the more or less porous structure of the sealing ring by capillary action, the penetrating action being assisted by the pressure in chamber 180. If desired, this modification may have holes 181 bored radially through the wall of the recess 182 arranged around the periphery of the holder to allow oil to contact sealing ring 25 and be absorbed thereby.

I claim:

In combination with an apertured housing, a rotatable shaft extending into said housing, a shoulder on said shaft having a radial abutment face exposed to the interior of said housing, a sleeve surrounding said shaft within said housing, said sleeve having a radial abutment face adjacent said shoulder and an inclined wall spaced therefrom, a ring of unctuous solid material seated in one of said faces and adapted to engage the other face, a plurality of separate preformed rings of packing material surrounding said sleeve, a spring urging said packing rings toward said wall so that they are axially deformed to a condition for resisting movement of said sleeve away from said shoulder, said spring also maintaining said ring of unctuous solid material engaged with said shoulder face, and a fluid pressure chamber between said inclined wall and the adjacent packing ring, the pressure in said chamber reacting against said sleeve to further oppose relative separation of said sleeve and shoulder.

WALTER GILBERT, Sr.